US009243930B2

(12) United States Patent  
Bushnell

(10) Patent No.: US 9,243,930 B2  
(45) Date of Patent: Jan. 26, 2016

(54) VEHICLE-BASED AUTOMATIC TRAFFIC CONFLICT AND COLLISION AVOIDANCE

(71) Applicant: The Boeing Company, Chicago, IL (US)

(72) Inventor: Glenn S. Bushnell, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/170,108

(22) Filed: Jan. 31, 2014

(65) Prior Publication Data

US 2014/0309916 A1    Oct. 16, 2014

Related U.S. Application Data

(60) Continuation of application No. 13/739,741, filed on Jan. 11, 2013, now Pat. No. 8,731,812, which is a division of application No. 11/864,335, filed on Sep. 28, 2007, now Pat. No. 8,380,424.

(51) Int. Cl.

| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G08G 5/00* | (2006.01) |
| *G08G 5/04* | (2006.01) |

(52) U.S. Cl.  
CPC ............ *G01C 23/005* (2013.01); *G08G 5/0052* (2013.01); *G08G 5/045* (2013.01)

(58) Field of Classification Search  
USPC ............. 701/3, 4, 14, 17, 120–122, 466, 527, 701/528, 301, 302; 340/951, 961; 342/29, 342/34–36, 455  
See application file for complete search history.

(56) References Cited

U.S. PATENT DOCUMENTS

| 2,560,265 A | * | 7/1951 | Adler, Jr. | ........................ 342/455 |
| 3,668,403 A | * | 6/1972 | Meilander | ....................... 701/121 |

(Continued)

FOREIGN PATENT DOCUMENTS

| FR | 2810146 | 12/2001 |
| FR | 2898686 | 9/2007 |

(Continued)

OTHER PUBLICATIONS

PCT International Search Report and Written Opinion for Application No. PCT/US2008/074413, dated May 8, 2009 (14 pages).

(Continued)

*Primary Examiner* — Rami Khatib  
(74) *Attorney, Agent, or Firm* — Hanley, Flight & Zimmerman, LLC

(57) ABSTRACT

Systems and methods for providing vehicle-centric collision avoidance are disclosed. An example method includes determining a first flight trajectory for a first aircraft, determining a second flight trajectory for a second aircraft, predicting a distance between the first aircraft and the second aircraft at a predicted closest point of approach based on the first and second flight trajectories, comparing the distance to a separation perimeter layer, the separation perimeter layer configured to provide a minimum separation distance from the first aircraft to the second aircraft, and altering the first flight trajectory when the distance breaches the separation perimeter layer.

20 Claims, 8 Drawing Sheets

(56) References Cited

U.S. PATENT DOCUMENTS

| | | | |
|---|---|---|---|
| 3,843,982 | A | 10/1974 | Lane et al. |
| 4,402,479 | A | 9/1983 | Phipps, III et al. |
| 4,839,658 | A | 6/1989 | Kathol et al. |
| 5,058,024 | A | 10/1991 | Inselberg |
| 5,381,140 | A | 1/1995 | Kuroda et al. |
| 5,566,074 | A | 10/1996 | Hammer |
| 5,627,546 | A | 5/1997 | Crow |
| 6,085,147 | A | 7/2000 | Myers |
| 6,393,358 | B1 | 5/2002 | Erzberger et al. |
| 6,493,609 | B2 | 12/2002 | Johnson |
| 6,552,669 | B2 | 4/2003 | Simon et al. |
| 6,646,588 | B2 | 11/2003 | Tran |
| 6,675,095 | B1 | 1/2004 | Bird et al. |
| 6,681,158 | B2 | 1/2004 | Griffith et al. |
| 6,795,772 | B2 | 9/2004 | Lin et al. |
| 6,799,094 | B1 | 9/2004 | Vaida et al. |
| 6,873,903 | B2 | 3/2005 | Baiada et al. |
| 6,885,313 | B2 | 4/2005 | Selk, II et al. |
| 6,950,037 | B1 | 9/2005 | Clavier et al. |
| RE39,053 | E | 4/2006 | Rees |
| 7,024,309 | B2 * | 4/2006 | Doane .......................... 701/301 |
| 7,136,016 | B1 | 11/2006 | Swensen et al. |
| 7,194,353 | B1 | 3/2007 | Baldwin et al. |
| 7,212,917 | B2 | 5/2007 | Wilson, Jr. et al. |
| 7,306,187 | B2 | 12/2007 | Lavan |
| 7,492,307 | B2 * | 2/2009 | Coulmeau ....................... 342/32 |
| 7,516,014 | B2 * | 4/2009 | Hammarlund et al. ........ 701/301 |
| 7,630,829 | B2 * | 12/2009 | Pepitone ....................... 701/120 |
| 7,706,979 | B1 * | 4/2010 | Herwitz ....................... 701/301 |
| 8,380,424 | B2 | 2/2013 | Bushnell |
| 8,731,812 | B2 | 5/2014 | Bushnell |
| 8,744,738 | B2 | 6/2014 | Bushnell |
| 2002/0080059 | A1 | 6/2002 | Tran |
| 2002/0133294 | A1 | 9/2002 | Farmakis et al. |
| 2002/0152029 | A1 * | 10/2002 | Sainthuile et al. ............ 701/301 |
| 2003/0122701 | A1 * | 7/2003 | Tran ............................ 342/29 |
| 2003/0193409 | A1 | 10/2003 | Crank |
| 2004/0078136 | A1 | 4/2004 | Cornell et al. |
| 2004/0193362 | A1 | 9/2004 | Baiada et al. |
| 2005/0156777 | A1 | 7/2005 | King et al. |
| 2006/0224318 | A1 | 10/2006 | Wilson, Jr. et al. |
| 2007/0150127 | A1 | 6/2007 | Wilson, Jr. et al. |
| 2009/0088972 | A1 | 4/2009 | Bushnell |
| 2009/0125221 | A1 | 5/2009 | Estkowski et al. |
| 2010/0121574 | A1 * | 5/2010 | Ariyur et al. .................. 701/301 |
| 2014/0019034 | A1 | 1/2014 | Bushnell |

FOREIGN PATENT DOCUMENTS

| | | |
|---|---|---|
| JP | 10285099 | 10/1998 |
| RU | 2176852 | 12/2001 |
| WO | 0041153 | 7/2000 |
| WO | 0065373 | 11/2000 |
| WO | 2009045664 | 4/2009 |

OTHER PUBLICATIONS

Chang et al., "Collision Avoidance for Multiple Agent Systems", 42nd IEEE Conference on Decision and Control, Dec. 2003, vol. 1, pp. 539-543 (5 pages).

Hill et al., "A Multi-Agent System Architecture for Distributed Air Traffic Control", AIAA Gauidance, Navigation and Control Conference, Aug. 2005, (11 pages).

Livadas et al., "High-Level Modeling and Analysis of the Traffic Alert and Collision Avoidance System (TCAS)", Proceedings of the IEEE, vol. 88, No. 7, Jul. 2000, pp. 926-948 (23 pages).

Mejia et al, "Safe Trajectory Tracking for the Two-Aircraft System", 2007 IEEE International Conference on Electro/Infomation Technology, May 2007, pp. 362-367(6 pages).

Schouwenaars et al., "Decentralized Cooperative Trajectory Planning of Multiple Aircraft with Hard Safety Guarantees", AIAA Guidance, Navigation and Control Conference, Aug. 2004, (14 pages).

Stipanovic et al., "Cooperative Avoidance Control for Multiagent Systems," submitted as an invited paper for the ASME Journal of Dynamic Systems, Measurements and Control specical issue on Multi-Agent Systems 2006, vol. 129, Sep. 2007, pp. 699-707 (9 pages).

United States Patent and Trademark Office, "Notice of Allowance", issued in connection with U.S. Appl. No. 11/864,335, dated Oct. 16, 2012, (5 pages).

United States Patent and Trademark Office, "Office Action", issued in connection with U.S. Appl. No. 11/864,335, dated Jan. 28, 2011, (15 pages).

United States Patent and Trademark Office, "Office Action", issued in connection with U.S. Appl. No. 11/864,335, dated Aug. 13, 2010, (11 pages).

United States Patent and Trademark Office, "Requirement for Restriction/Election", issued in connection with U.S. Appl. No. 11/864,335, dated Jun. 30, 2010, (8 pages).

United States Patent and Trademark Office, "Non-Final Office Action", issued in connection with U.S. Appl. No. 13/739,741 on Jun. 21, 2013 (7 pages).

United States Patent and Trademark Office, "Notice of Allowance", issued in connection with U.S. Appl. No. 13/739,741 on Oct. 11, 2013 (7 pages).

Mejia et al, "Safe Trajectory Tracking for the Two-Aircraft System," 2007 IEEE International Conference on Electro/ Information Technology, May 2007, pp. 362-367.

United States Patent and Trademark Office, "Office Action," dated Jun. 21, 2013, regarding U.S. Appl. No. 13/739,741, 23 pages.

United States Patent and Trademark Office, "Notice of Allowance," dated Oct. 11, 2013, regarding U.S. Appl. No. 13/739,741, 22 pages.

European Patent Office, "European Search Report", Dec. 3, 2013, regarding Application No. EP12178454, 8 pages.

Chen, "Sense and Avoid (SAA) Technologies for Unmanned Aircraft (UA)," National Cheng Kung University, Dec. 4, 2008, 38 pages, http://ord.ncku.edu.tw/ezfiles/3/1003/img/467/20081204_ppt.pdf.

Shakernia et al., "Sense and Avoid (SAA) Flight Test and Lessons Learned," AIAA 2006 Conference and Exhibit May 2007, Rohnert Park, California, pp. 1-15.

Suwal et al., "SeFAR Integration Test Bed for See and Avoid Technologies," AIAA 2005-7178, Infotech@Aerospace, Sep. 2005, Arlington, Virginia, pp. 1-7.

Blackman, "Multiple-Target Tracking with Radar Applications," Artech House Radar Library, 1986, 14 pages.

Smith, "Sequential Estimation of Observation Error Variances in a Trajectory Estimation Problem," AIAA Journal, vol. 5, No. 11, Nov. 1967, pp. 1964-1970.

Myers et al., "Adaptive Sequential Estimation with Unknown Noise Statistics," IEEEE Transactions on Automatic Control, Aug. 1976, pp. 520-523.

Nordsjo, "Target Tracking Based on Kalman-type Filters Combined with Recursive Estimation of Model Disturbances," 2005, IEEE, pp. 1-6.

United States Patent and Trademark Office, "Non-Final Office Action", issued in connection with U.S. Appl. No. 13/196,678, Sep. 12, 2012, 19 pages.

United States Patent and Trademark Office, "Final Office Action", issued in connection with U.S. Appl. No. 13/196,678, Jan. 15, 2013, 10 pages.

United States Patent and Trademark Office, "Notice of Allowance", issued in connection with U.S. Appl. No. 13/196,678, Sep. 20, 2013, 19 pages.

United States Patent and Trademark Office, "Notice of Allowance", issued in connection with U.S. Appl. No. 13/196,678, Jan. 31, 2014, 27 pages.

* cited by examiner

VEHICLE-BASED AUTOMATIC TRAFFIC CONFLICT AND COLLISION AVOIDANCE

RELATED APPLICATIONS

This patent arises from a continuation of U.S. patent application Ser. No. 13/739,741, filed Jan. 11, 2013, which is a divisional of U.S. patent application Ser. No. 11/864,335 (now U.S. Pat. No. 8,380,424), filed Sep. 28, 2007. The entireties of U.S. patent application Ser. No. 13/739,741 and U.S. patent application Ser. No. 11/864,335 are incorporated by reference herein.

TECHNICAL FIELD

This present disclosure is related to systems and methods for guidance aircraft, and more specifically, to systems and methods for guiding aircraft to avoid collisions.

BACKGROUND

Currently, human air traffic controller and ground-based air traffic control systems play a major role in collision avoidance between aircraft. Pilots generally rely on their situational awareness and the instructions provided by the air traffic controllers to avoid air traffic conflicts. However, the ability of pilots to avoid potential collisions may be affected by human errors on the part of pilots and air traffic controllers. Often, human errors are caused by factors such as fatigue, stress, or lack of experience.

Some aircraft may be equipped with avionic devices such as the traffic alert and collision avoidance system (TCAS) to reduce the danger of potential collision between aircraft. Typically, TCAS interrogates the secondary surveillance radar transponders of nearby aircraft and alerts a pilot of an aircraft when potential flight path conflicts with other aircraft are detected. Effective collision avoidance is then dependent on the pilot of the aircraft exchanging escape maneuver intentions with the pilots of the conflict aircraft, as well as dependent on the pilots making the proper escape maneuvers. Additionally, in some instances, the escape maneuvers elected by the pilots may not be compatible with other air traffic, thus creating further collision potential. This problem may be exacerbated by heavy air traffic conditions. Therefore, novel systems and methods that provide automated vehicle-centric collision avoidance without the need for human involvement, thereby reducing the possibility of human error, would have utility.

SUMMARY

The present disclosure is directed to systems and methods for providing automated vehicle-centric collision avoidance between aircraft without the need for human involvement. The automated vehicle-centric collision avoidance system may reduce or eliminate the possibility of human error and improperly selected escape maneuvers. Additionally, the need for air traffic controllers to direct aircraft separations may be diminished, thereby easing their workload. Accordingly, air traffic controller may be able to manage larger numbers of aircraft than previously possible. The ability to automatically avoid air traffic collisions may also facilitate the deployment of unmanned aircraft for both commercial and military operations.

In accordance with various embodiments, a method for automatically providing air traffic collision avoidance includes determining a first flight trajectory for a first aircraft. The method also includes determining a second flight trajectory for a second aircraft. A distance between the first aircraft and the second aircraft at a closest point of approach (CPA) is predicted. The predicted closest point of approach is then compared to a separation perimeter layer. The separation perimeter layer is configured to provide a minimum separation distance from the first aircraft to the second aircraft. When the predicted closest point of approach breaches the separation perimeter, the first flight trajectory is altered to provide collision avoidance. In some embodiments, at least a portion of the first trajectory may be reinstated at any time the predicted distance at the closest point of approach no longer breaches the separation perimeter.

In additional embodiments, the method also includes predicting a second distance between the second aircraft and the first aircraft at another closest point of approach (CPA) based on the first and second flight trajectories. Next, the second distance is compared to another separation perimeter layer. The other separation perimeter layer is configured to provide another minimum separation distance from the second aircraft to the first aircraft. When the distance at the predicted closest point of approach breaches the other separation perimeter, the second trajectory is altered to provide collision avoidance.

A computer readable medium that includes computer-executable instructions that perform collision avoidance is disclosed in other embodiments. The acts include determining a first flight trajectory for a first aircraft. The method also includes determining a second flight trajectory for a second aircraft. A distance between the first aircraft and the second aircraft at a closest point of approach (CPA) is predicted. The predicted closest point of approach is then compared to a separation perimeter layer. The separation perimeter layer is configured to provide a minimum separation distance from the first aircraft to the second aircraft. When the predicted closest point of approach breaches the separation perimeter, the first flight trajectory is altered to provide collision avoidance. In some embodiments, at least a portion of the first trajectory may be reinstated at any time the predicted distance at the closest point of approach no longer breaches the separation perimeter.

In additional embodiments, an aircraft is disclosed. The aircraft includes a structural assembly, and at least one system for guiding aircraft at least partially disposed within the structural assembly. The guidance system includes a prediction component configured to predict a distance between the first aircraft and the second aircraft at a closest point of approach (CPA) based on the first and second flight trajectories. The guidance system also includes a comparison component configured to compare the distance to a separation perimeter layer. The separation perimeter layer is configured to provide a minimum separation distance from the first aircraft to the second aircraft. The system further includes an alteration component configured to alter the first flight trajectory when the distance breaches the separation perimeter layer.

While specific embodiments have been illustrated and described herein, as noted above, many changes can be made without departing from the spirit and scope of the disclosure. Accordingly, the scope of the disclosure should not be limited by the disclosure of the specific embodiments set forth above. Instead, the embodiments should be determined entirely by reference to the claims that follow.

BRIEF DESCRIPTION OF THE DRAWINGS

Embodiments of systems and methods in accordance with the teachings of the present disclosure are described in detail below with reference to the following drawings.

DETAILED DESCRIPTION

Embodiments of systems and methods in accordance with the present disclosure are directed to automatically providing vehicle-centric collision avoidance between aircraft without the need for human involvement. Many specific details of certain embodiments are set forth in the following description and in FIGS. 1-7 to provide a thorough understanding of such embodiments. The present disclosure may have additional embodiments, or may be practiced without one or more of the details described below.

Generally, embodiments of systems and methods in accordance with the present disclosure provide an automated vehicle-centric collision avoidance system. Aircraft equipped with this automated vehicle-centric collision avoidance system may automatically perform escape maneuvers to avoid collisions with other aircraft. In this way, the automatic vehicle-centric collision avoidance system may advantageously reduce or eliminate the possibility of human error and the performance of escape maneuvers that can themselves create further potential for collision. Additionally, the need for air traffic controllers to direct aircraft separations for collision avoidance may be diminished, thereby easing their workload. Accordingly, the automatic vehicle-centric collision avoidance system may advantageously enable air traffic controllers to manage larger numbers of aircraft than previously possible. Moreover, the ability to automatically avoid air traffic collisions may also facilitate the deployment of unmanned aircraft for both commercial and military operations.

Figure 1A:
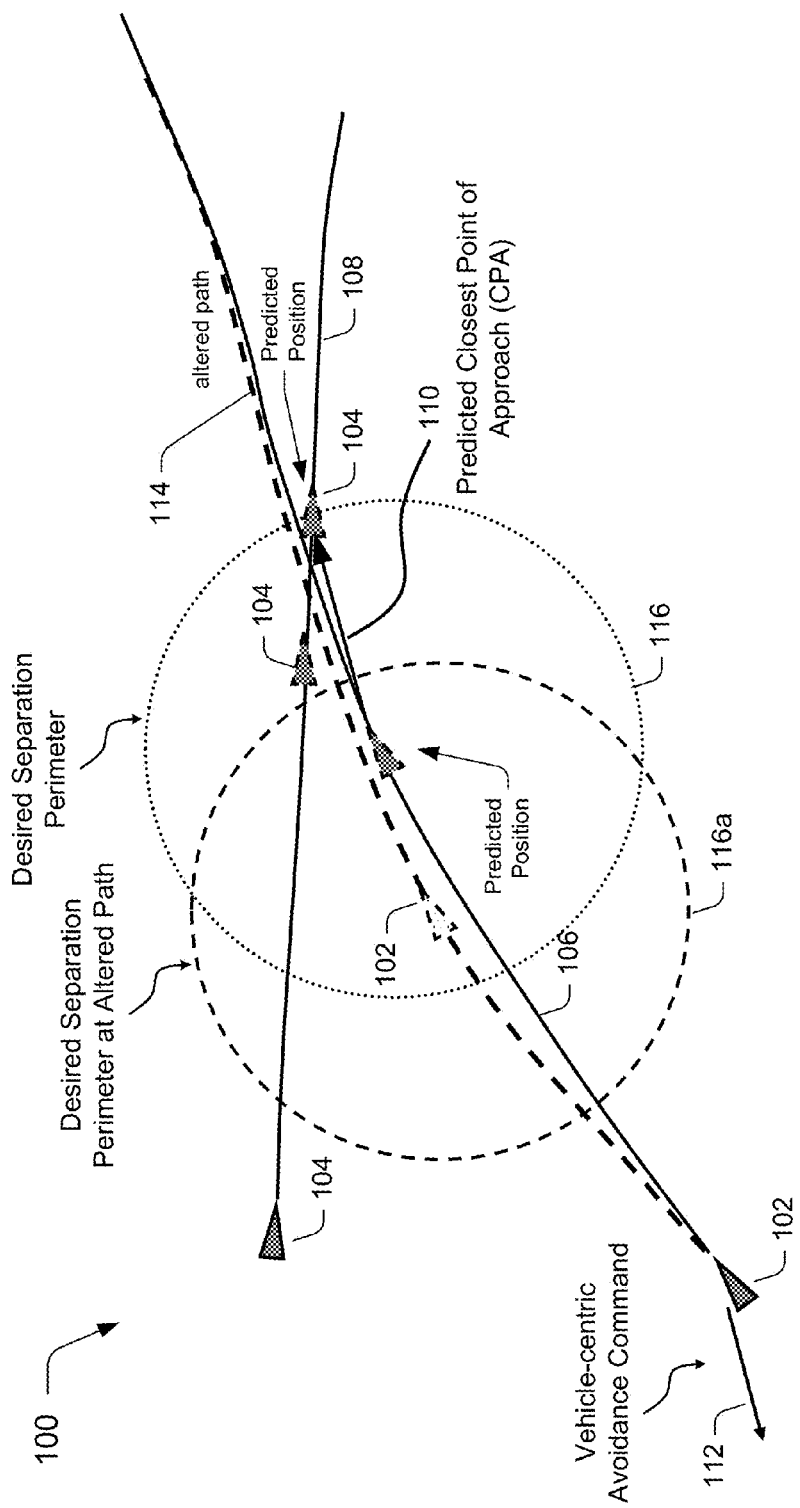
FIGS. 1a and 1b are aerial views depicting exemplary concepts for providing vehicle-centric collision avoidance, in accordance with various embodiments.

FIG. 1a depicts a first exemplary concept for providing collision avoidance using a vehicle-centric collision avoidance system in accordance with an embodiment. Specifically, FIG. 1a shows an aircraft 102 and an aircraft 104. The aircraft 102 may be equipped with a vehicle-centric collision avoidance system. Aircraft 102 is traveling on a flight path 106, while aircraft 104 is traveling on a flight path 108. The vehicle-centric collision avoidance system of the aircraft 102 may be configured to predict a closest point of approach (CPA) 110. The CPA 110 indicates the smallest range that occurs between the aircraft 102 and the aircraft 104 as they continue on their flight path 106 and flight path 108, respectively. According to various implementations, the avoidance system of aircraft 102 may also predict a time-to-go before reaching the CPA 110, or the time duration before the aircraft 102 reaches the CPA 110. Moreover, the prediction of the CPA 110 may further include the computation of the current range and a separation direction at the time of CPA.

A separation perimeter 116 may be predefined in the vehicle-centric collision avoidance system of the aircraft 102. Accordingly, the vehicle centric collision avoidance system of the aircraft 102 may produce avoidance commands when the predicted separation range of the CPA 110 is within, or "breaches" the predefined separation perimeter 116. The generated avoidance commands may be configured to alter the flight path of the aircraft 102. The generated avoidance commands may also alter the speed of the aircraft.

As shown in FIG. 1a, the vehicle-centric collision avoidance system of aircraft 102 may generate one or more commands 112 that cause the aircraft 102 to reactively alter its flight path 106 to a transformed flight path 114. In this way, the vehicle-centric collision avoidance system in the aircraft 102 may automatically ensure that proper separation is maintained between aircraft 102 and 104 at all times. The proper separation may be in the form of desired separation perimeter 116. The desired separation perimeter 116 may change location, as illustrated by separation perimeter 116a, when the flight path 106 of the aircraft 102 is altered to flight path 114. The vehicle-centric collision avoidance system of the aircraft 102 may continuously monitor for traffic aircraft while the aircraft is on altered flight path 114. In this way, the aircraft 102 may return to its path 106 when the automatic vehicle-centric collision system of the aircraft 102 determines that the potential breach of the separation perimeter 116a no longer exists. It will be appreciated that in other embodiments, a plurality of separation perimeter layers may be predefined in the vehicle-centric collision avoidance system of the aircraft 102. For example, the separation perimeter 116 may include multiple separation perimeter layers. As further described below, the plurality of separation perimeter layers may be defined based on temporal, aircraft velocity, aircraft motion rates, and distance parameters.

Figure 1B:
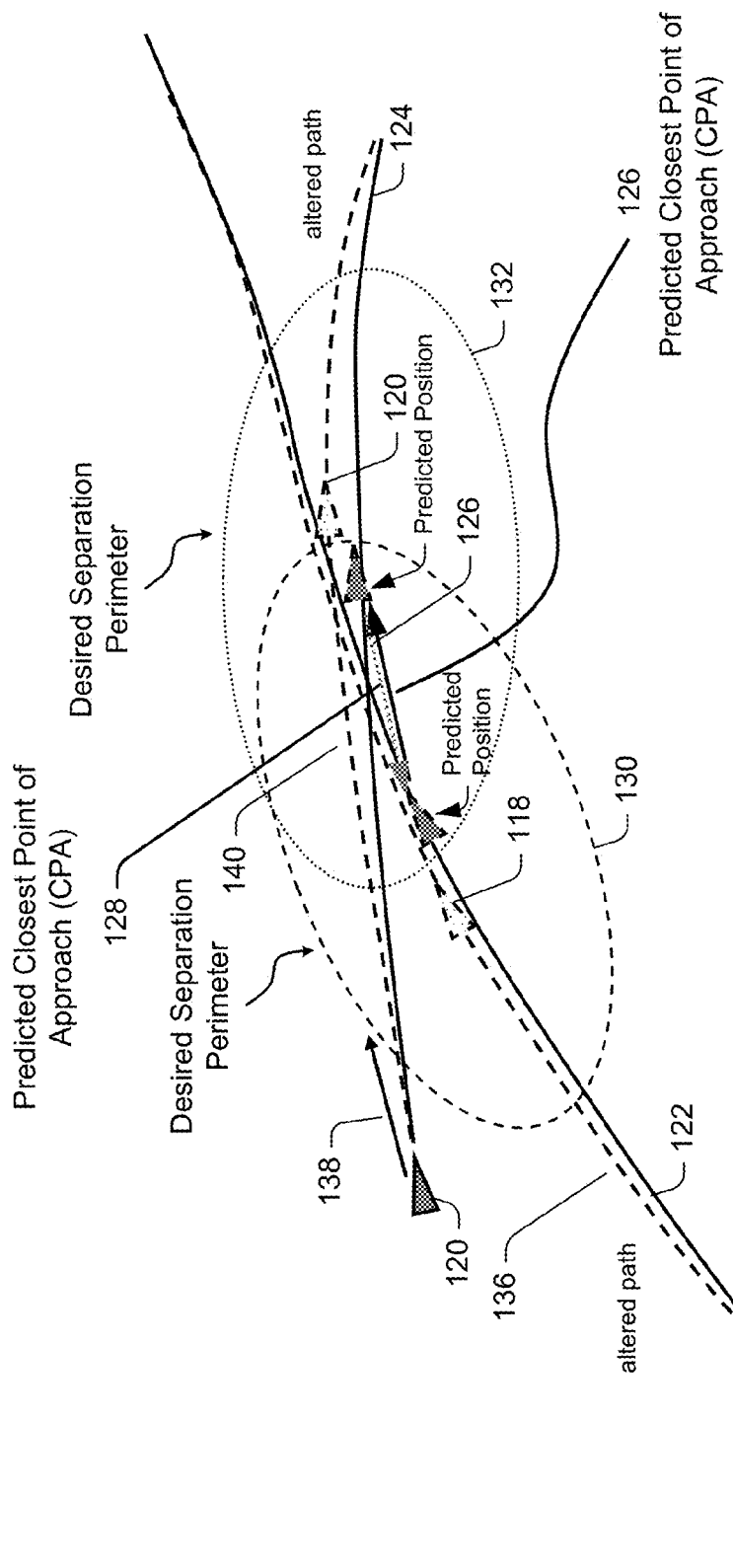

FIG. 1b depicts a second exemplary concept for providing collision avoidance using a vehicle-centric collision avoidance system in accordance with an embodiment. This exemplary concept demonstrates the avoidance interaction of a plurality of aircraft, wherein each of the aircraft is equipped with a vehicle-centric collision avoidance system. Specifically, FIG. 1b shows an aircraft 118 and an aircraft 120, each of which is equipped with a vehicle-centric collision avoidance system. The aircraft 118 is traveling on a flight path 122, while the aircraft 120 is traveling on a flight path 124. The avoidance system in the aircraft 118 may be configured to predict a closest point of approach (CPA) 126. Likewise, the avoidance system in aircraft 120 may be configured to predict a CPA 128. The CPA 126 and the CPA 128 indicate the smallest range that occurs between the aircraft 118 and the aircraft 120 as they continues on their flight path 122 and flight path 124, respectively.

According to various implementations, the vehicle-centric collision avoidance system in each of the aircraft 118 and 120 may also predict a time-to-go before reaching the CPA 126 and CPA 128, respectively. Moreover, the predictions of the CPA 126 and CPA 128 may further include the computation of the current range and a minimum separation direction at the time of CPA.

A separation perimeter 130 may be predefined in the vehicle-centric collision avoidance system of the aircraft 118. Similarly, a separation perimeter 132 may be predefined in the vehicle collision avoidance system of the aircraft 120.

Accordingly, the vehicle-centric collision avoidance system in the aircraft 118 may produce avoidance commands when the predicted separation range of the CPA 126 is within, or "breaches" a predefined separation perimeter 130.

In a corresponding fashion, the vehicle-centric collision avoidance system in the aircraft 120 may produce avoidance commands when the predicted separation range of the CPA 128 is within, or "breaches" a predefined separation perimeter 132. Each set of the generated avoidance commands may be configured to alter the flight paths of the aircraft 118 and 120, respectively. The generated avoidance commands may also alter the speed of each aircraft.

For example, as shown in FIG. 1b, the vehicle-centric collision avoidance system of aircraft 118 may generate one or more commands 134 that cause the aircraft 118 to reactively alter its flight path 122 to a transformed flight path 136. Likewise, the vehicle-centric collision avoidance system of aircraft 120 may generate one or more commands 138 that cause aircraft 120 to alter its flight path 124 to transformed flight path 140. In this way, the vehicle-centric collision avoidance system in each aircraft may automatically ensure that proper separation is maintained between aircraft 118 and 120 at all times. The proper separation may be in the form of desired separation perimeters 130 and 132, respectively. However, each aircraft 118 and 120 may return to their original paths 122 and 124, respectively, when the automatic vehicle-centric collision system in each aircraft determines that the potential breaches of the corresponding separation perimeters 130 and 132 no longer exist.

It will be appreciated that in other embodiments, a plurality of separation perimeter layers may be predefined in the vehicle-centric collision avoidance system of each aircraft 118 and 120. For example, each of the separation perimeters 130 and 132 may include multiple separation perimeter layers. As further described below, the plurality of separation perimeter layers may be defined based on temporal, aircraft velocity, aircraft motion rates, and distance parameters.

Accordingly, the capability to automatically alter aircraft paths may advantageously reduce or eliminate the risk of collisions due to human error or miscommunication associated with current collision avoidance systems. Additionally, the vehicle-centric avoidance system may decrease the workload of ground controllers by diminish their involvement mitigating potential aircraft collision.

Figure 2:
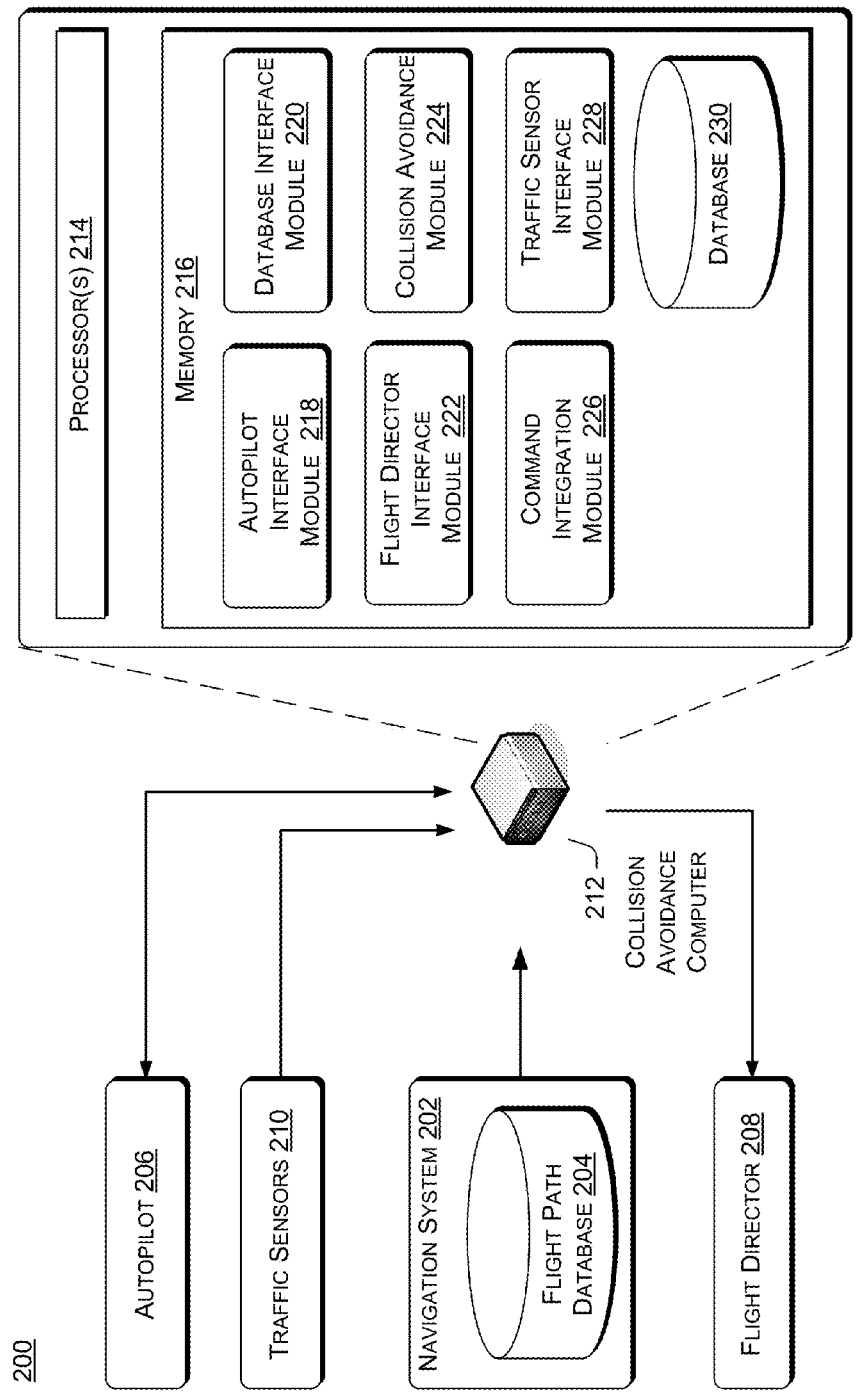
FIG. 2 is a block diagram depicting an exemplary avionics system in which methods for providing vehicle-centric collision avoidance, as shown in FIGS. 1a and 1b, may be implemented in accordance with an embodiment.

FIG. 2 is a block diagram depicting an exemplary avionics system in which methods for providing vehicle-centric collision avoidance, as shown in FIGS. 1a and 1b, may be implemented. The avionics system 200 includes a navigation system 202 that include a flight path database 204, an autopilot 206, a flight director 208, traffic sensors 210, and an exemplary collision avoidance computer 212. According to various embodiments, methods for providing altered flight paths in accordance with the teachings of the present disclosure may be implemented in the exemplary collision avoidance computer 212.

The navigation system 202 may be used to provide the geographical position of the aircraft during flight. The navigation system 202 may include an Inertial Reference System (IRS), an Attitude Heading and Reference System (AHRS), a Global Positioning System (GPS), and other similar systems. In various embodiments, the navigation system 202 may include an onboard flight path database 204 that provides predetermined courses for the aircraft.

The autopilot 206 is generally configured to pilot the aircraft without human intervention. In various implementations, the autopilot 206 may obtain flight information (e.g., position, heading, attitude, and speed) from the navigation system 202. The autopilot 206 may also obtain course information from the flight path database 204. By comparing the flight information with the course information, the autopilot 206 may compute flight trajectories and issue control commands (e.g., throttle settings and flight control surface commands) to an aircraft's flight control system to maintain the aircraft on a particular flight path.

The flight director 208 is generally configured to compute and display the proper path for the aircraft to one or more pilots during a specific flight. For example, when a pilot is holding a course, the flight director 208 may interact with the flight path database 204 and the autopilot 206 to computer and display the necessary flight maneuvers to the pilot. The flight director 208 may include a flight director indicator (FDI), a horizontal situation indicator (HSI), a mode selector, and a flight director computer. Moreover, the FDI may include a display that may present an attitude indicator, a fixed aircraft symbol, pitch and bank command bars, a glide slope indicator, a localizer deviation indicator, and the like. The flight director 208 may furnish a pilot with steering commands necessary to obtain and hold a desired path. In some embodiments, the flight director 208 may further provide steering commands to the autopilot 206, which the autopilot 206 may translate into flight control system commands.

The traffic sensors 210 may be configured to obtain positions of traffic aircraft. According to various embodiments, the traffic sensor 210 may be configured to receive traffic data from a Traffic Alert and Collision Avoidance System (TCAS), an Automatic Dependent Surveillance (ADS) system, a ground air traffic control (ATC) system, or an on-board traffic surveillance radar system, as well as other air traffic detection systems.

As further shown in FIG. 2, the collision avoidance computer 212 has processing capabilities and memory suitable to store and execute computer-executable instructions. In one embodiment, the collision avoidance computer 212 includes one or more processors 214 and memory 216. The memory 216 may include volatile and nonvolatile memory, removable and non-removable media implemented in any method or technology for storage of information, such as computer-readable instructions, data structures, program modules or other data. Such memory includes, but is not limited to, random access memory (RAM), read-only memory (ROM), electrically erasable programmable read-only memory (EEPROM), flash memory or other memory technology, compact disc, read-only memory (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computer system.

The memory 216 contains modules that enable the collision avoidance computer 212 to perform various functions. These modules may include an autopilot interface module 218, a database interface module 220, a flight director interface module 222, a collision avoidance module 224, a command integration module 226, a traffic sensor interface module 228, and a database 230. These modules may be implemented as software or computer-executable instructions that are executed by the one or more processors 214 to perform the functions as described below.

The autopilot interface module 218 is configured to enable the collision avoidance computer 212 to communicate with the autopilot 206. The communication may be established over an electrical connection, an optical connection, and the like. According to various embodiments, the autopilot interface module 218 may be configured to enable the autopilot 206 to perform collision avoidance under the direction of the collision avoidance computer 212.

The database interface module 220 enables the reading of data from and writing of data to the database 230. According to various embodiments, the database interface module 220 may be activated by the other modules in memory 216, as further described below. The database 230 may be configured to store information that may be used to maintain an aircraft on various flight paths as well as to avoid collisions. For instance, the database 230 may contain trajectory and speed laws. The trajectory and speed laws may dictate the performance and maneuver capabilities of an aircraft. Moreover, the database 230 may also store aircraft separation limits and aircraft response limits. The aircraft separation limits are configured to define a separation perimeter, such as the separation perimeter 116 described in FIG. 1a. These stored parameters may dictate the dimensions and shape of the separation perimeter. For example, the parameters may specify measurements such as diameter, width, length, and height, and the like. The aircraft response limits, as further described below, may dictate the proximity and time at which an aircraft alters its flight path to militate collision potential.

The flight director interface module 222 may facilitate the communication between the flight director 208 and the collision avoidance module 224. Accordingly, the flight director interface module 222 may enable the flight director 208 to provide a pilot with the necessary steering commands.

The collision avoidance module 224 may be employed to analyze the traffic sensor data received from the traffic sensor module 222. Accordingly to various implementations, the collision avoidance module 224 may alter the flight path of an aircraft if the aircraft cannot maintain a desired separation perimeter 116, as described in FIG. 1a. Specifically, the functions of the collision avoidance module 224 are described below in FIG. 3.

The command integration module 226 may be configured to use the autopilot interface module 218 and the flight director interface module 222 to respectively integrate collision avoidance commands, flight trajectory changes, or new flight trajectories, to the autopilot 206 and the flight director 208. The traffic sensor interface module 228 may be configured to provide traffic data from the traffic sensors 210 to the collision avoidance computer 212. In turn, the traffic sensor interface module 228 may be used to provide the data from the traffic sensors 210 to the collision avoidance module 224.

Figure 3:
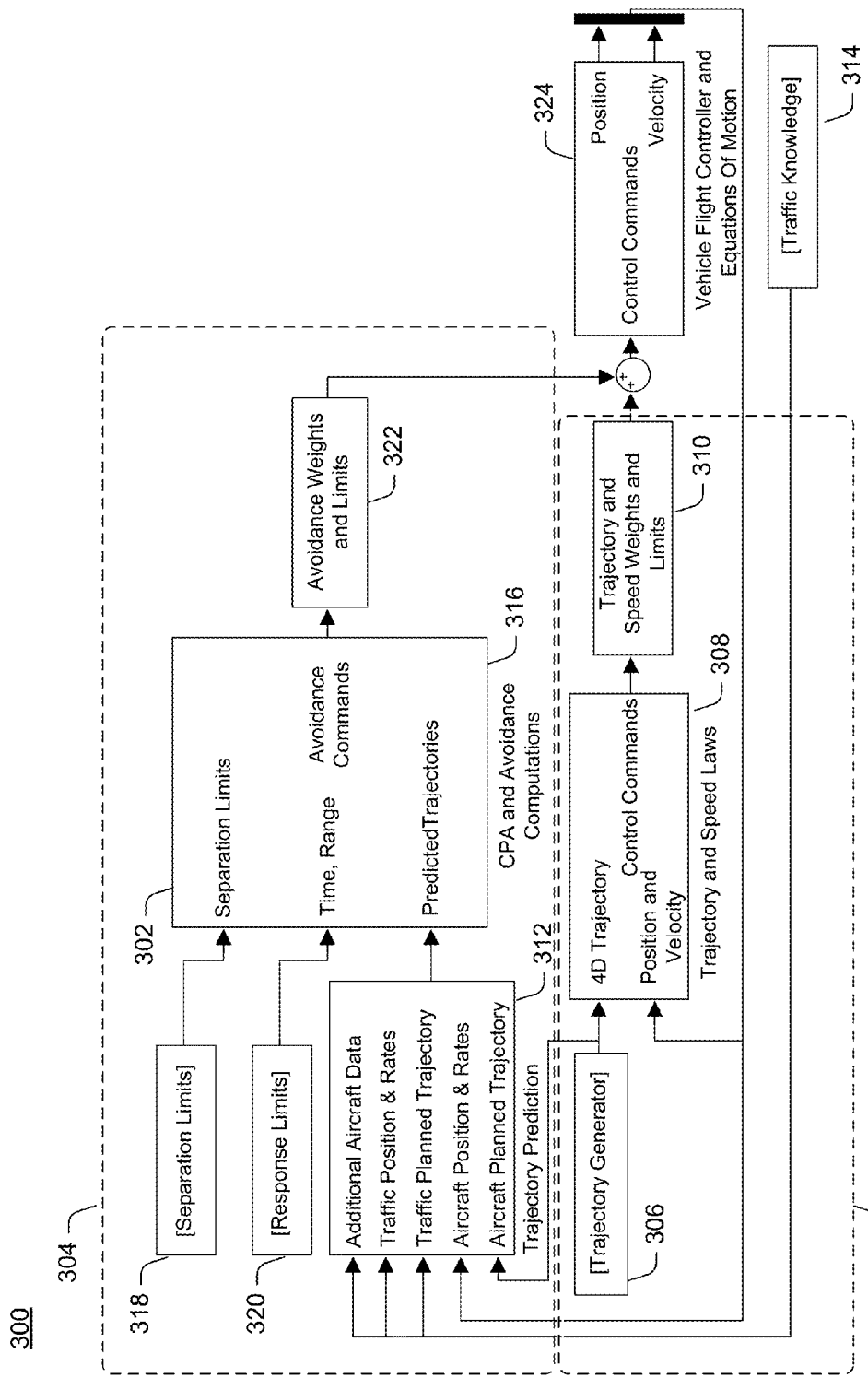
FIG. 3 is a block diagram depicting a vehicle-centric collision avoidance system that issues avoidance commands, in accordance with an embodiment.

FIG. 3 is a block diagram depicting a vehicle-centric collision avoidance system 300 that provides avoidance commands. The system 300 may include a flight control component 302. The flight control component 302 is generally configured to maintain an aircraft on predetermined flight paths as the aircraft travels between various destinations. Additionally, the system 300 may also include a collision avoidance component 304. In some embodiments, the collision avoidance component 304 may be carried out by the collision avoidance module 224 illustrated in FIG. 2. As further described below, the collision avoidance component 304 may interact with the flight control component 302 to alter the trajectory of the aircraft to provide collision avoidance.

The flight control component 302 may include a trajectory generator function 306, a control command function 308, and a command modification function 310. According to various implementations, the functions 306-310 may be carried out by one or more of a navigation system 202, the autopilot 206, and the flight director 208, as described above in FIG. 2.

The trajectory generator function 306 is configured to produce predicted flight paths for the aircraft. The flight paths produced may be referred to as "4D trajectories", as the flight paths may dictate the position of the aircraft at a particular time.

The control command function 308 is configured to compare a generated flight path with the current position and velocity of the aircraft to determine the deviation and the needed flight path corrections. The control command function 308 may produce control commands that implement the flight path corrections according to trajectory and speed control laws. According to various implementations, the control commands may be configured to change throttle settings, as well as manipulate the flight control surfaces of an aircraft.

In some implementations, the control commands produced by the control command function 308 may be further processed by the assignment function 310 before they are implemented on the respective flight control surfaces and propulsion system. Specifically, the assignment function 310 may be configured to implement the control commands as a function of flight conditions using gains (weights) and limits. For example, the assignment function 310 may assign a high weight value to one or more control commands when the aircraft has severely deviated from a flight path. The high weight value may cause the one or more control commands to be expediently implemented to a high degree so as to cause the aircraft to quickly return to the designated flight path. Conversely, the assignment function 310 may assign a low weight value to one or more control commands when the aircraft experiences only a slight deviation from the flight path. In such an instance, the control commands may be gradually implemented so that the return of the aircraft to the designated flight path is more measured.

As further shown in FIG. 3, the collision avoidance component 304 of the system 300 may issue avoidance commands that compete with the control commands provided by the flight control component 302. In this way, the avoidance commands may alter a flight trajectory to provide collision avoidance. As described below, the issue of avoidance commands may be carried out by functions 312-322 of the collision avoidance component 304.

The trajectory analysis function 312 may be configured to predict the flight path of the aircraft with respect to the flight paths of other traffic aircraft. The trajectory analysis function 312 may obtain traffic knowledge 314 from the traffic sensor 210 via the traffic sensor interface module 228. Traffic knowledge may include the position, velocity, heading, heading rates of change, climb rates, descend rates, velocity rate of change, and trajectory of the traffic aircraft. In other instances, traffic knowledge may also include the flight plans of particular traffic aircraft. For example, if a traffic aircraft has filed a flight plan, the trajectory analysis function 312 may obtain the flight plan from a ground source (e.g., a flight plan database). The flight plan may provide trajectory analysis function 312 with detail knowledge regarding the positions of the traffic aircraft at particular moments in time. However, in additional examples where the FMS (flight management function) of each traffic aircraft is capable of transmitting position and rate data to other aircraft, the trajectory analysis function 312 may also obtain the flight knowledge directly from each traffic aircraft.

Additionally, the trajectory analysis function 312 may acquire the predicted trajectory of the aircraft that includes the function 312, i.e., self-aircraft trajectory, from the trajectory generator function 306. Once the trajectory analysis function 312 has received trajectory data from the various sources, the function 312 may process the data to determine the desired trajectory information. This trajectory information may include (1) the position of the self-aircraft; (2) the rates of self-aircraft, (3) the planned trajectory of the self-aircraft; (3) the position of each traffic aircraft, (4) the rates of each traffic aircraft; and (5) the planned trajectory of each traffic aircraft. In other words, the trajectory analysis module 312 may predict the expected flight path of each aircraft for which it has provided with data. Moreover, the trajectory analysis function 312 may be configured to pass the predicted trajectories to a computations function 316. As used herein, rates for the self-aircraft and each traffic aircraft may include rates of heading change, climb rates, descend rates, velocity, and rates of velocity change (i.e., acceleration).

The computations function 316 may be configured to process the predicted trajectories of the aircraft and provide aircraft avoidance commands. Specifically, the predicted trajectories of the aircraft may be employed to predict whether at their closest point of approach (CPA), a plurality of aircraft are expected to "breach" a predetermined separation perimeter, such as the separation perimeter 116 described in FIG. 1a. For instance, if the aircraft are predicted to be simultaneously inside the separation perimeter at their CPA, then the separation perimeter is expected to be "breached." When the computations function 316 reaches such a prediction, the function may be configured to issue avoidance commands. The avoidance commands may preemptively alter the flight paths of the aircraft so that no separation perimeter is "breached" at the future CPA of the aircraft.

Specifically, as described above, the flight paths alteration of an aircraft, as provided by the computations function 316, is illustrated in FIG. 1a. As shown in FIG. 1a, aircraft 102 and aircraft 104 are expected to "breach" the desired separation perimeter 116, (as they will be simultaneously inside the perimeter) at their CPA. Accordingly, the computations function of a collision avoidance system in aircraft 102, such as the computations function 316, may alter the aircraft 102 from flight path 106 to flight path 114. An exemplary CPA calculation, as well as an exemplary generation of avoidance commands, as performed by the computations function 316, is described in FIG. 4.

Figure 4:
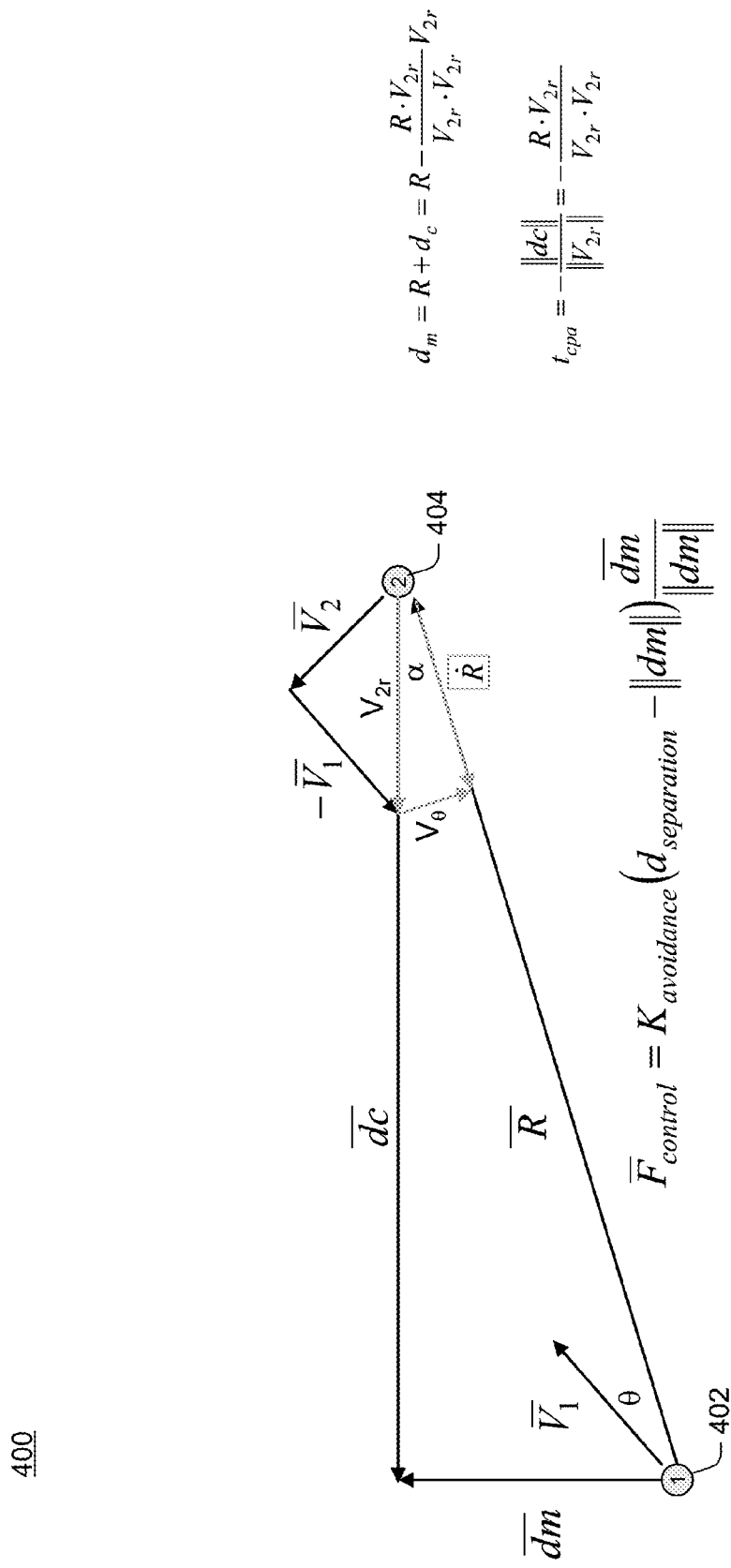
FIG. 4 illustrates exemplary equations for computing a closest point of approach between a plurality of aircraft and the generation of avoidance commands, in accordance with an embodiment.

FIG. 4 illustrates exemplary equations for computing a closest point of approach between an aircraft 402 and an aircraft 404. Moreover, FIG. 4 also illustrates the generation of avoidance commands. As shown in FIG. 4, the closest point of approach vector ($d_m$) between aircraft 402 and 404 may be represented by the equation (assuming aircrafts continue along a straight paths with constant velocities):

$$\overline{d}_m = \overline{R} + \overline{d}_c = \overline{R} - \frac{\overline{R} \cdot \overline{V}_{2r}}{\overline{V}_{2r} \cdot \overline{V}_{2r}} \overline{V}_{2r} \quad (1)$$

wherein $\overline{V}_{2r}$ is the velocity vector of the aircraft 404 relative to the aircraft 402, and R is the range vector between aircraft 402 and 404. Furthermore, the time at the closest point of approach ($t_{cpa}$) may be represented by the equation:

$$t_{cpa} = -\frac{\|\overline{d}c\|}{\|\overline{V}_{2r}\|} = -\frac{\overline{R} \cdot \overline{V}_{2r}}{\overline{V}_{2r} \cdot \overline{V}_{2r}} \quad (2)$$

wherein $$\frac{\|\overline{d}c\|}{\|\overline{V}_{2r}\|}$$

is the norm of the distance $\overline{dc}$ between the aircraft 402 and the aircraft 404 over the norm of the velocity, $\overline{V}_{2r}$ of the aircraft 404 relative to the aircraft 402.

The control avoidance control law for the generation of a vehicle-centric avoidance command, $\overline{F}_{control}$, may be represented by the equation:

$$\overline{F}_{control} = -\sum_{1}^{n} \sum_{1}^{p} K_{p,n} \cdot \overline{C}_{p,n} \quad (3)$$

where $$\overline{C}_{p,n} = Cx_{p,n} \cdot \overline{1}_x + Cy_{p,n} \cdot \overline{1}_y + Cz_{p,n} \cdot \overline{1}_z \quad (4)$$

and wherein p represents the number of perimeter layers, and n represents the number of traffic aircraft used in the generation of an avoidance command. Additionally, $K_{p,n}$ contain the control gains applied to each respective control direction ($\overline{1}_x$, $\overline{1}_y$, $\overline{1}_z$) for each respective traffic aircraft n under evaluation by the self-aircraft and for any of a number of respective perimeter layers p. Additionally, $\overline{C}_{p,n}$ contain the corresponding collision avoidance command components used in the generation of one or more avoidance commands.

According to various embodiments, $\overline{C}_{p,n}$ may be selected as follows:

$$\overline{C}_{p,n} = (d_p - \|\overline{d}m_n\|) \frac{\overline{d}m_n}{\|\overline{d}m_n\|} \quad (5)$$

where $d_p$ is the desired separation distance for each perimeter evaluated, and which may be measured along the closest point of approach (CPA) distance vector $\overline{d}m_n$. If the control gains are equal in each direction and the same for each traffic aircraft then a single avoidance gain may be defined as follows:

$$K_{p,n} = k_{avoidance}, \text{ for all } (p,n) \quad (6)$$

Thus, in this example, the avoidance command may reduce to:

$$\overline{F}_{control} = -k_{avoidance} \sum_{1}^{n} \sum_{1}^{p} (d_p - \|\overline{d}m_n\|) \frac{\overline{d}m_n}{\|\overline{d}m_n\|} \quad (7)$$

Further by example, if there is only one traffic aircraft under evaluation, that is, n=1, and only one separation perimeter is evaluated, p=1, (as illustrated in FIG. 1a), then the avoidance command may reduce to:

$$\overline{F}_{control} = -k_{avoidance}(d_1 - \|\overline{d}m_1\|) \frac{\overline{d}m_1}{\|\overline{d}m_1\|} \quad (8)$$

wherein $k_{avoidance}$ contains the gain or control weight, $d_1$ is the desired separation distance that may constitute the separation perimeter, and $\|\overline{d}m_1\|$ is the norm of the closest point of approach distance $\overline{dm}$.

As shown, $\overline{F}_{control}$ provides the force or avoidance command, along the direction of $\overline{dm}$ to increase the $\overline{dm}$ between the aircraft 402 and 404. Moreover, according to the above equation, as the closest point of approach distance $\|\overline{dm}\|$ becomes increasingly smaller, the magnitude of the avoidance command, $F_{control}$, will proportionally increase. In other words, according to various embodiments, the computations function 316 may increase the magnitude of the avoidance command as CPA distance decreases. For example, the computations function 316 may provide an avoidance command in the form of an acceleration command that increases the thrust of the aircraft 102. According to various embodiments, the avoidance command functions ($\overline{C}_{p,n}$) may be exponential functions, quadratic functions, or other functions that adjust the command as the self-aircraft approaches the CPA. In other embodiments, the avoidance command functions may be functions of other parameters and vectors such as relative velocity and range.

According to some embodiments, the exemplary equations illustrated above may be implemented to establish multiple separation perimeter layers. Each perimeter layer may be maintained based on a unique set of values, gains, functions, and separation limits. Moreover, perimeter layers may be established based on time, distance, rate, and any combination thereof. For example, a temporal perimeter layer may be established when the time to closest point of approach is less than a specified separation limit. A rate and distance perimeter layer may be established, for example, when avoidance command initiation is based on both the magnitude of the relative rate and the range between the self-aircraft and any traffic aircraft. In addition, the desired separation distance of a spatial separation perimeter may include a set of distances and reference directions ($\overline{i}_x, \overline{i}_y, \overline{i}_z$) that establish the separation perimeter shape, wherein each direction may have its own avoidance gain. In this way, it will be appreciated that a plurality of different separation perimeter layers may be respectively established between the self-aircraft and each traffic aircraft.

Returning to FIG. 3, the separation perimeter, such as the desired separation perimeter 116 illustrated in FIG. 1a, may be established based on separation limits 318. To put it another way, the separation limits 318 may define the dimensions of the separation perimeter 116. In one implementation, the separation limits 318 may define a minimum separation distance that extends in all directions. In such an implementation, the separation perimeter may be in the form of a sphere. For example, a separation perimeter may be established with all traffic aircraft based on the separation distance of one mile in all directions. In other words, a plurality of aircraft are considered to have "breached" a separation perimeter if they are closer than one mile at their CPA.

In other implementations, the separation limits 318 may be configured to provide other separation perimeter shapes. For example, the separation limits 318 may define a radius that extends in all longitudinal and latitudinal directions, and a fixed distance in the vertical axis for all points that extend from the longitudinal and latitudinal directions. In such an instance, the separation limits 318 may define a cylindrical space. However, it will be appreciated that the separation limits 318 may be configure to define a variety of other three-dimensional shapes (e.g., ellipsoid, spheroid, half sphere, cubes, octahedron, etc.) The three-dimensional shapes may not be symmetrical. Specifically, the three-dimensional shapes of the separation limits 318 may be defined based on self-aircraft and traffic aircraft class, (e.g., heavy commercial aircraft, light private aircraft, etc.), maneuverability of the self-aircraft and traffic aircraft, as well as the speed of the self-aircraft and traffic aircraft.

The computations function 316 may be further configured to utilize response limits 320 in the calculation of avoidance commands. Response limits 320 may determine the promptness at which the avoidance commands are carried out. For example, the response limits 320 may be established so that when the predicted CPA between the self-aircraft and a traffic aircraft is likely to occur at a large range (distance) away from the self-aircraft's current position, the computations function 316 may delay the provision of the one or more avoidance commands. Conversely, if the predicted CPA between the self-aircraft and the traffic vehicle is likely to occur at a small distance from the self-aircraft's current position, the computations function 316 may immediately provide the one or more avoidance commands to for execution.

In some embodiments, the computations function 316 may be configured to compute the time-to-go, that is, the time duration before the aircraft reaches the CPA. This time duration may be referred to as time-to-closest point of approach (TCPA). In such embodiments, the response limits 320 may also include time limitations. For example, if the CPA is likely to occur far in the future, such as beyond a predetermined time interval, the computations function 316 may delay avoidance command execution. Conversely, if the CPA is imminent in time, such as before a predetermined time interval expires, the computations function 316 may more rapidly provide the avoidance commands for execution. Furthermore if the TCPA is negative then the CPA has already occurred and the aircraft are thence moving away from one another. In this case, the avoidance command may be set to zero. The fixed time interval may be any time increment (e.g., seconds, minutes, etc.). In this way, the computations module 316 may prioritize avoidance based on the imminence of the potential collision with each of a plurality of traffic aircraft. For example, the computation of TCPA and the implementation of time limitations as response limits 320 may be suitable for collision avoidance between aircraft with long TCPA duration such as those that are flying in formation at close range along parallel paths, and in trail, or head on trajectories at far range with near zero closest point of approach distance.

The avoidance modification function 322 may be configured to assign gain, or avoidance weights, to the one or more avoidance commands generated by the computations function 316. The avoidance weights are represented by $K_{p,n}$ described in FIG. 3. Avoidance weights may be used to establish the relative strength of the avoidance and steering commands. For example, the avoidance modification function 322 may contain a low gain for a long range first perimeter layer and a high gain for a near range second perimeter layer. In this example, the first perimeter layer may enable separation using minor path corrections at far range. Also in this example, the second perimeter layer may insure the ability of the avoidance commands to overcome the normal control commands issued by the control command function 308 at near range using higher gains.

In this way, the avoidance computations function 316 and avoidance modification function 322 may increase the tendency of the self-aircraft to alter its flight path as it closes in on the traffic aircraft. Moreover, it will be appreciated that the avoidance modification function 322 may be configured to assign various gains to the avoidance commands for each perimeter and each traffic aircraft.

In other embodiments, the avoidance modification function 322 may be further configured to assign gains that selectively implement a portion of the avoidance commands. For example, the avoidance modification function 322 may be configured to assign no weight to an avoidance command component that causes an aircraft to dive when the aircraft is below a predetermined minimum altitude. This may prevent the aircraft from performing unsafe flight path alterations. In alternative implementations, the weight assignment function 322 may be configured to assign zero weight to avoidance command components that turn the aircraft in a particular direction (e.g., right, left).

The avoidance modification function 322 may be further configured to constrain the avoidance commands with control limits. For example, the avoidance modification function 322 may provide control limits that prevent avoidance commands from being implemented when the deviations from the flight path are negligible. In other examples, the command and avoidance modification functions 322 and 310 may use control limits to prevent radical movements of the aircraft or command saturation of the flight control system in the aircraft.

Once the avoidance modification function 322 has assigned the necessary gain and/or limits to the avoidance commands, the avoidance commands are passed from the collision avoidance module 224 to the command integration module 226 shown in FIG. 2. The command integration module 226 may be configured to implement a command integration process 324. Specifically, the command integration module 226 is configured to apply the avoidance commands to the control commands. As described above, the control commands are produced by the control command function 308 and modified by the command modification function 310. The avoidance commands may include heading rate change commands, climb or descend rate modification commands, acceleration and deceleration commands, and other steering commands such as speed, altitude, and heading alteration commands. In other words, the avoidance commands may be configured to affect computations of thrust and flight control surface settings in command integration process 324.

In various embodiments, the command integration module 226 may implement the avoidance commands so that they compete with the control commands issued by the control command function 308 as weighted and limited by command modification function 310. In this way, the collision avoidance module 224 may alter the flight path of an aircraft when the collision avoidance 224 predicts that a "breach" of the desired separation perimeter 116, as described in FIG. 1a, is expected.

Additionally, the command integration module 226 may also provide position and rate readings back to the control command function and the trajectory analysis function 312. In some implementations, since the control command function 308 may be carried out by an aircraft flight controller (e.g., one or more of an autopilot 206, flight director 208, etc.), the position and velocity readings may be passed back to those systems. In turn, the control command function 308 may use the readings to generate further control commands in the same process as described above. Likewise, the trajectory analysis function 312 may use the feedback position and velocity readings to continuously update its flight trajectory predictions.

It will be appreciated that collision avoidance module 224 may be configured to continuously monitor the trajectories of the self-aircraft and the traffic aircraft and predict future "breaches" of the separation perimeter by the CPA between the aircraft. This continuous monitoring may ensure that the flight path of the aircraft is altered each time a CPA breach of the separation perimeter occurs. However, the collision avoidance module 224 may terminate the output of the avoidance commands when the trajectories of the aircraft and the traffic aircraft indicates that the separation perimeter is no longer being breach by the CPA. In this, small flight path alterations may be continuously made to militate against potential collisions. In some embodiments, the collision avoidance module 224 may implement the avoidance commands even when a pilot is in control of the aircraft.

Figure 5A:
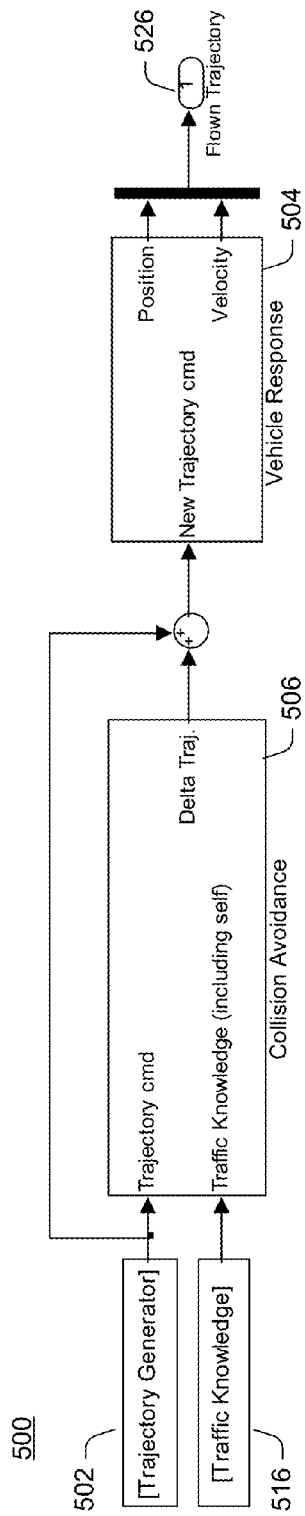
FIGS. 5a and 5b are block diagrams depicting a vehicle-centric collision avoidance system that modifies flight trajectories, in accordance with an embodiment.
Figure 5B:
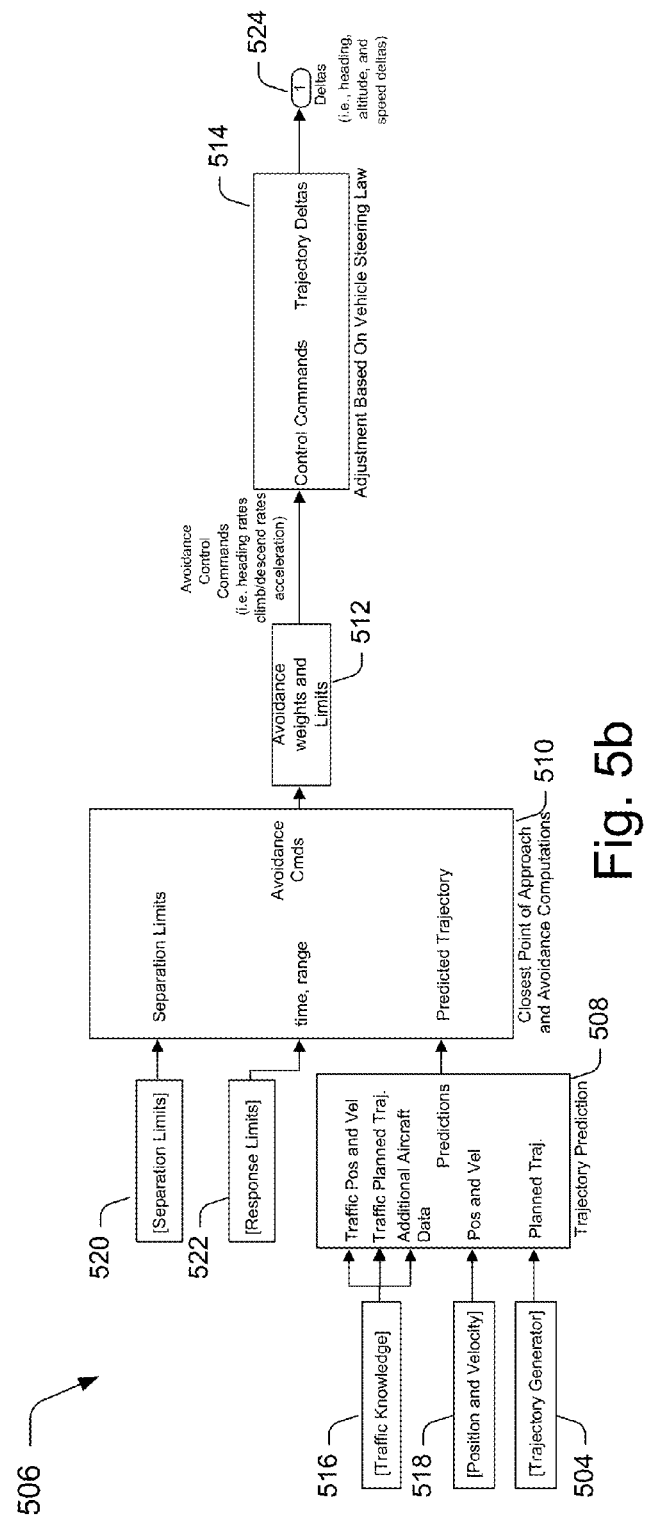

FIGS. 5a and 5b are block diagrams depicting a vehicle-centric collision avoidance system that modifies flight trajectories. As shown, the vehicle-centric collision avoidance system 500 may include a flight control system. The flight control system may be configured to maintain an aircraft on predetermined flight trajectories as the aircraft travels between various destinations. Specifically, the flight control systems may include a trajectory generator function 502 and a vehicle response function 504. The system 500 may also include a collision avoidance component 506. The collision avoidance component 506 may be configured to modify the flight trajectories, as provided by the flight control component 502 to provide collision avoidance. According to various implementations, the functions 502-504 may be carried out by one or more of a navigation system 202, the autopilot 206, and the flight director 208, as described above in FIG. 2.

The trajectory generator function 502 is configured to produce predicted flight paths for an aircraft. The flight paths produced may be referred to as "4D trajectories", as the flight paths may dictate the position of the aircraft at a particular time. The vehicle response function 504 may be configured to compare a generated flight path with the current position and velocity of the aircraft to determine any deviation and the needed flight path correction. Based on this, the vehicle response function 504 may produce control commands that implement the flight trajectories according to trajectory, speed control laws, other control laws, as well as vehicle dynamics. According to various implementations, the control commands may be configured to change the throttle settings, as well as manipulate the flight control surfaces of the aircraft.

The collision avoidance component 506 may modify the generated flight path for the aircraft, as produced by trajectory generator function 502, before they are implemented as control commands by the vehicle response function 504 to fly a trajectory 526. In such implementations, the collision avoidance component 506 may be carried out by the collision avoidance module 224 described in FIG. 2. FIG. 5b illustrates the various functions 508-514 that may be carried out by the collision avoidance component 506.

The trajectory analysis function 508 may be configured to predict the flight path of the aircraft with respect to the flight paths of other traffic aircraft. The trajectory analysis function 508 may obtain traffic knowledge 516 from the traffic sensor 210 via the traffic sensor interface module 228. Traffic knowledge may include the position, velocity, heading, and trajectory of the traffic aircraft. In other instances, traffic knowledge may also include the flight plans or intent of particular traffic aircraft. For example, if a traffic aircraft has filed a flight plan or an updated intention, the trajectory analysis function 508 may obtain the flight plan from a central source (e.g., a flight plan database) or from the FMS on the traffic aircraft via a data link. The flight plan may provide trajectory analysis function 508 with detail knowledge regarding the positions of the traffic aircraft at particular moments in time.

Additionally, the trajectory analysis function 508 may acquire the predicted trajectory of the aircraft, i.e., self-aircraft trajectory, from the trajectory generator function 502. Moreover, the trajectory analysis function 508 may also acquire position and velocity data 518 for the aircraft from one of the autopilot 206 and flight director 208. Once the trajectory analysis function 508 has received trajectory, position, and velocity data from the various sources, the function may process the data and determine the desired trajectory information. This trajectory information may include (1) the position and rates of the self-aircraft; (2) the planned trajectory of the self-aircraft; (3) the position and rates of each traffic aircraft; and (4) the planned trajectory of each traffic aircraft. In other words, the trajectory analysis module 512 may predict the expected flight path of each aircraft for which it has provided with data. Moreover, the trajectory analysis function 508 may be configured to pass the predicted trajectories to a computations function 510.

The computations function 510 may be configured to process the predicted trajectories of the aircraft and provide aircraft avoidance commands. Specifically, the predicted trajectories of the aircraft may be employed to predict whether at their closest point of approach (CPA), the aircraft and at least one second traffic aircraft are expected to "breach" a predetermined separation perimeter, such as the separation perimeter 116 described in FIG. 1a. For instance, if the second aircraft is predicted to be inside the separation perimeter at their CPA, then the separation perimeter is expected to be "breached". When the computations function 510 reaches such a prediction, the function may be configured to issue avoidance commands. The avoidance commands may preemptively alter the flight paths of the aircraft so that no separation perimeter is "breached" at the future CPA of the aircraft.

Specifically, as described above, the flight paths alteration of an aircraft, as provided by the computations function 510, is illustrated in FIG. 1a. As shown in FIG. 1a, aircraft 104 is expected to "breach" the desired separation perimeter 116 at their CPA. Accordingly, the CPA computation function of a collision avoidance system in aircraft 102, such as the computations function 510, may alter the aircraft 102 from flight path 106 to flight path 114. Similarly, as shown in FIG. 1b, if a collision avoidance system that includes a computations function, such as the computations function 510, resides in each of the aircrafts 118 and 120, each respective aircraft function may alter their own path in a complementary fashion, i.e., each alters its path to one that does not cause further collision conflict with the altered path of another aircraft. An exemplary CPA calculation, as well as an exemplary generation of avoidance commands, as performed by the computations function 510, are described in FIG. 4.

The separation perimeter, such as the desired separation perimeter 116 illustrated in FIG. 1a, may be established based on separation limits 520. In other words, the separation limits 520 may define the dimensions of the separation perimeter. In one implementation, the separation limits 520 may define a minimum separation distance that extends in all directions. In such an implementation, the separation perimeter may be in the form a sphere. For example, a separation perimeter may be established based on the separation distance of one mile in all directions. In such as case, a plurality of aircraft are considered to have "breached" a separation perimeter if they are closer than one mile at their CPA. In additional implementations, the separation perimeter may be configured with a plurality of layers based on temporal, aircraft velocity, aircraft motion rates, and distance parameters, as described above in FIG. 4.

The computations function 510 may be further configured to utilize response limits 522 in the calculation of avoidance commands. Response limits 522 may determine the promptness at which the avoidance commands are carried out. For example, the responses limits 516 may be established so that when the predicted CPA between the self-aircraft and a traffic aircraft is likely to occur at a large range, that is, distance away from the self-aircraft's current position, the computations function 510 may delay the provision of the one or more avoidance commands for execution. Conversely, if the predicted CPA between the self-aircraft and the traffic vehicle is likely to occur at a small distance from the self-aircraft's current position, the computations function 510 may immediately provide the one or more avoidance commands for execution. In other embodiments, response limits 522 may also include time limitations. For example, if the CPA is likely to occur far in the future, such as beyond a predetermined time interval, the computations function 510 may delay avoidance command execution. Conversely, if the CPA is imminent in time, such as before a predetermined time interval expires, the computations function 510 may more rapidly provide the avoidance commands for execution. The fixed time interval may be any time increment (e.g., seconds, minutes, etc.).

In this way, the computations function 510 may initiate avoidance based on the imminence of the potential collision with each of a plurality of traffic aircraft. For example, the implementation of time limitations as response limits by the computations function 510 may be suitable for collision avoidance between aircraft with long TCPA such as those that are flying in formation at close range along parallel paths, or head on trajectories at far range with near zero closest point of approach distance.

The avoidance modification function 512 may be configured to assign gain, or avoidance weights, to the one or more avoidance commands generated by the computations function 510. The avoidance weights ($K_{p,n}$) may be represented by $K_{avoidance}$ as shown in FIG. 3. Avoidance weights may be used to determine the strength of the avoidance command. According to various embodiments, the avoidance modification function 512 may increase the gain in one or more avoidance commands as the CPA (time or distance) between the self-aircraft and a traffic aircraft decreases. For example, a first set of avoidance computations, limits, and gains may enable separation using minor path corrections upon a breach of a separation perimeter layer that is far in range. In another example, a second set of avoidance computations, limits, and gains may provide high-gain avoidance commands to overcome the normal control commands issued by the control command function 308 upon the breach of a near range separation perimeter.

In this way, the avoidance computations function 510 and avoidance modification function 512 may increase the tendency of the self-aircraft to alter its flight path as it closes in on the traffic aircraft. Moreover, it will be appreciated that the avoidance modification function 512 may be configured to assign different gains to other generated avoidance commands based on the specific separation perimeter layer being breached.

The trajectory modification function 514 includes adjustment algorithms that are configured to modify the flight trajectories generated by the trajectory generator function 506. Specifically, the trajectory modification function 514 generates changes for the flight trajectory, or trajectory deltas, based on the weighted and limited avoidance commands from the function 512. The trajectory modification function 514 may then integrate the trajectory delta with a generated trajectory to produce a new modified trajectory.

In specific embodiments, function 512 may output avoidance commands to change heading rate, climb and descend rates, and acceleration/deceleration. The avoidance commands are then converted into delta trajectory commands based on the steering law for the aircraft, as well as the desired aircraft response to the steering commands. For example, the aircraft steering law may be configured to convert heading change into a heading rate command based on a proportional control law with gain K. In such an instance, when an aircraft is predicted to breach a separate perimeter, a steering adjustment algorithm of the trajectory modification function 514 may produce a heading delta, or change, by dividing a collision avoidance heading rate command by K. In this case, the steering law will convert it back to a heading rate command. In another example, when the pre-determined trajectory generated by the trajectory generator function 506 includes a set of way points, the trajectory modification function 514 may include an adjustment algorithm that moves the next way point of the trajectory based on one or more avoidance commands. In this way, the desired heading change may be produced to provide collision avoidance in the event a separation perimeter is breached. Subsequent to the trajectory modification, the new modified trajectory 524 may be passed on to the vehicle response function 504 to be implemented. The vehicle response function 504 may include the steering laws and vehicle response. In this way, these embodiments may provide collision avoidance without the need to modify aircraft control commands, (i.e., steering law), as described in FIG. 3. Accordingly, collision avoidance may be implemented as a separate function outside of the steering and flight control functions, such as outside the trajectory generator function 502 and the vehicle response function 504.

It will be appreciated that collision avoidance component 506 may be configured to continuously monitor the trajectories of the self-aircraft and the traffic aircraft and predict future "breaches" of the separation perimeter by the CPA avoidance computations between the aircraft. In response, the trajectory modification function 514 may continuously make adjustments to the flight trajectory whenever the "breaches" occur to ensure that proper separation between aircraft is maintained.

Figure 6:
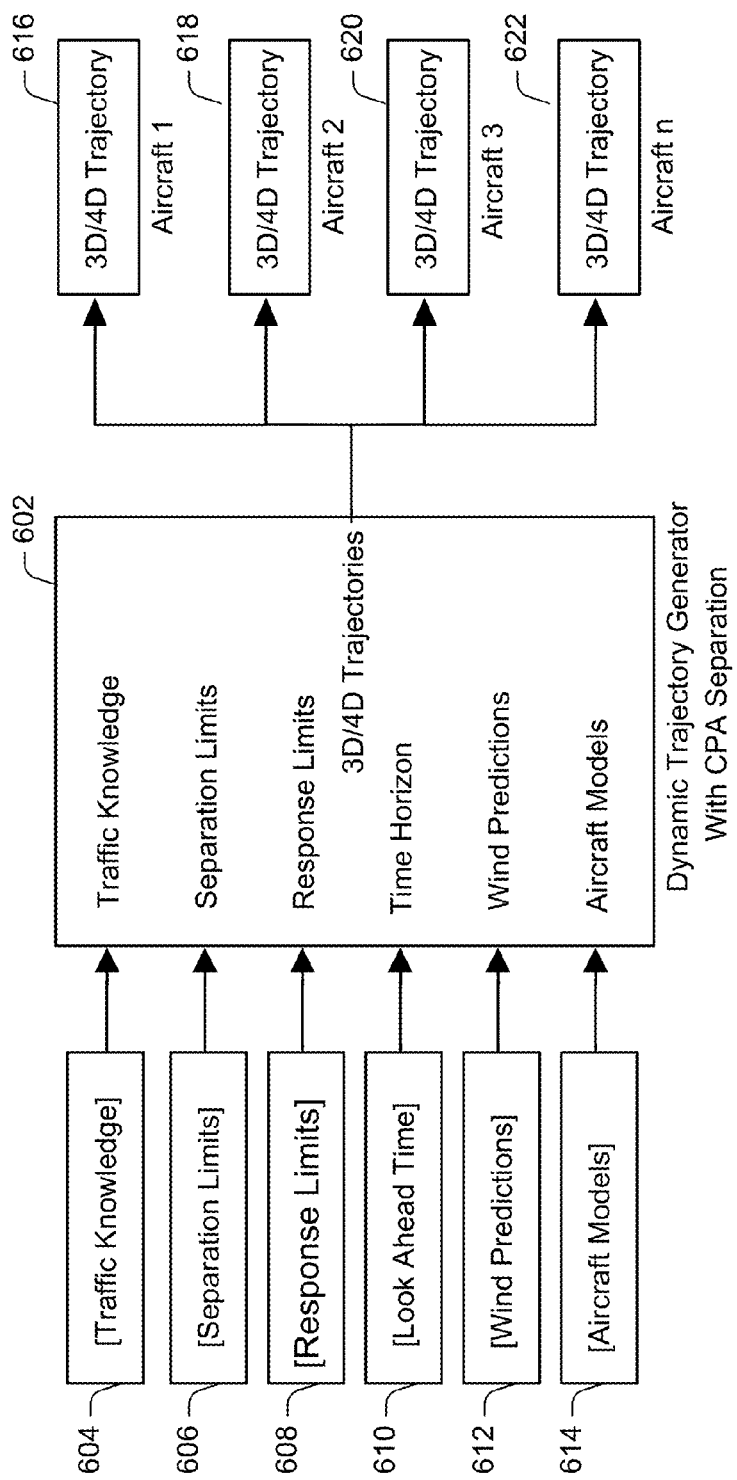
FIG. 6 is a block diagram depicting a dynamic trajectory generator that provides trajectory planning for a plurality of vehicles, in accordance with an embodiment.

FIG. 6 is a block diagram depicting a dynamic trajectory generator that that provides trajectory planning for a plurality of vehicles. According to various embodiments, the dynamic trajectory generator 602 may be a ground-based trajectory generator configured to provide "deconflicted" flight trajectories for a plurality of aircraft. In other words, the aircraft trajectories supplied by the dynamic trajectory generator 602 are configured to maintain minimum separations between aircraft at all times. Specifically, deconflicted trajectories may be generated by running independently optimal but conflicted trajectories through a simulation that contains models of the vehicle dynamics, their respective separation control laws or mechanisms, and wind predictions. The processing of these trajectories by the dynamic trajectory generator 602 provides the deconflicted trajectories.

As shown in FIG. 6, the dynamic trajectory generator 602 may be configured to receive data that includes traffic knowledge 604, separation limits 606, response limits 608, a look ahead time 610, wind prediction 612, and aircraft models 614. In turn, the dynamic trajectory generator 602 may generate a plurality of aircraft flight trajectories based on CPA computations. These trajectories may include 3-dimensional trajectories, and as well as 4-dimensional trajectories that dictate the positions of the aircraft at a particular time.

The traffic knowledge 604 may include positions and flight trajectories of a plurality of traffic aircraft. According to various embodiments, the traffic sensing function 604 may be configured to receive traffic data from a Traffic Alert and Collision Avoidance System (TCAS), an Automatic Dependent Surveillance (ADS) system, a ground air traffic control (ATC) system, or traffic surveillance sensor systems onboard aircraft, as well as other air traffic detection systems. In other embodiments, traffic knowledge 604 may include flight trajectories from flight plans, flight trajectories predicted trajectories from current aircraft positions and velocities, and other predetermined flight trajectories.

The separation limits 606 may be configured define the dimensions of separation perimeters between the plurality of aircraft. In one implementation, the separation limits 606 may define a minimum separation distances between aircraft that extends in all directions. In such an implementation, the separation perimeter may be in the form a sphere. For example, a separation perimeter may be established based on the separation distance of one mile in all directions. In such as case, a plurality of aircraft are considered to have "breached" a separation perimeter if they are closer than one mile at their CPA. In other implementations, the separation limit function 606 may be configured to provide other separation perimeter shapes, as well as multiple separation layers, as described above.

The response limits 608 may determine the promptness at which the avoidance commands are carried out. For example, the response limits may be established so that when the predicted CPA between the two traffic aircraft is likely to occur at a large range, the provision of the one or more avoidance commands may be delayed. Conversely, if the predicted CPA between two aircraft is likely to occur at a small distance from an aircraft's position, the aircraft may be provided one or more immediate avoidance commands. It will be appreciated that the response limits may be set to increase the likelihood of separation using minor corrections at long range, or to meet other optimization objectives. In other embodiments, the response limit may include time limitations for the execution of avoidance commands. For example, if the CPA is likely to occur far in the future, such as beyond a predetermined time interval, an avoidance command may be delayed. Conversely, if the CPA is imminent in time, such as before a predetermined time interval expires, avoidance commands may be rapidly provided. The implementation of time limitations as response limits may also be suitable for collision avoidance between aircraft with long TCPA duration such as those that are flying in formation at close range along parallel paths, and in trail, or head on trajectories at far range with near zero closest point of approach distance.

The look ahead time 610 includes specific time horizons for which the dynamic trajectory generator 602 is to generate the flight trajectories for a plurality of aircraft. The wind predictions 612 include wind data which may be used by the dynamic trajectory generator 602 to plot the flight trajectories. In some embodiments, the wind prediction 612 may be obtained from aviation weather reports such as METAR reports, Terminal Aerodrome Forecasts (TAF) from the National Weather Service (NWS), as well as other meteorological report sources. The aircraft models 614 may include aircraft performance data. Such performance data may include aircraft steering laws, aircraft control laws, performance dynamics and capabilities.

The dynamic trajectory generator 602 may be configured to run simulations using the data inputs 604-614 to generate deconflicted flight trajectories for a plurality of aircraft. For instance, the flight trajectories derived from traffic knowledge 604 may be used by the dynamic trajectory generator 602 to predict whether at their closest point of approach (CPA), a plurality of aircraft are expected to "breach" a predetermined separation perimeter as determined by the separation limits 606. Based on these predictions, the dynamic trajectory generator 602 may change the flight trajectories to generate deconflicted trajectories that eliminate these separation perimeter breaches. In various implementations, the simulations may be conducted using the exemplary equations shown in FIG. 4. Moreover, the dynamic trajectory generator 602 may be configured use to the response limits 608 to tailor the trajectory changes, similar to those described in FIG. 5b. In some implementations, the dynamic trajectory generator 602 may also account for wind predictions 612. For example, trajectory changes may be modified using the wind predictions 612 so that any of their influence on flight trajectories may be countered and nullified. In further embodiments, the dynamic trajectory generator 602 may also take into consideration the aircraft models 614 to design flight trajectories that conform to the performance capabilities of the aircraft.

Once the deconflicted trajectories have been determined for a plurality of aircraft, the dynamic trajectory generator 602 may use the aircraft models 614 to translate the deconflicted trajectories into control commands for implementation with each of the plurality of aircraft. The control commands may include heading rate change commands, climb or descend rate modification commands, acceleration and deceleration commands, and other steering commands such as speed, altitude, and heading alteration commands. Alternatively, the dynamic trajectory generator 602 may provide the flight trajectories to the aircraft for implementation by an autopilot or flight management system onboard the each aircraft, such as aircraft 616-622. It will be appreciated that the simulations may be continually executed by the dynamic trajectory generator 602 out to a specified time horizon using current aircraft state information and proposed trajectories or intentions.

Figure 7:
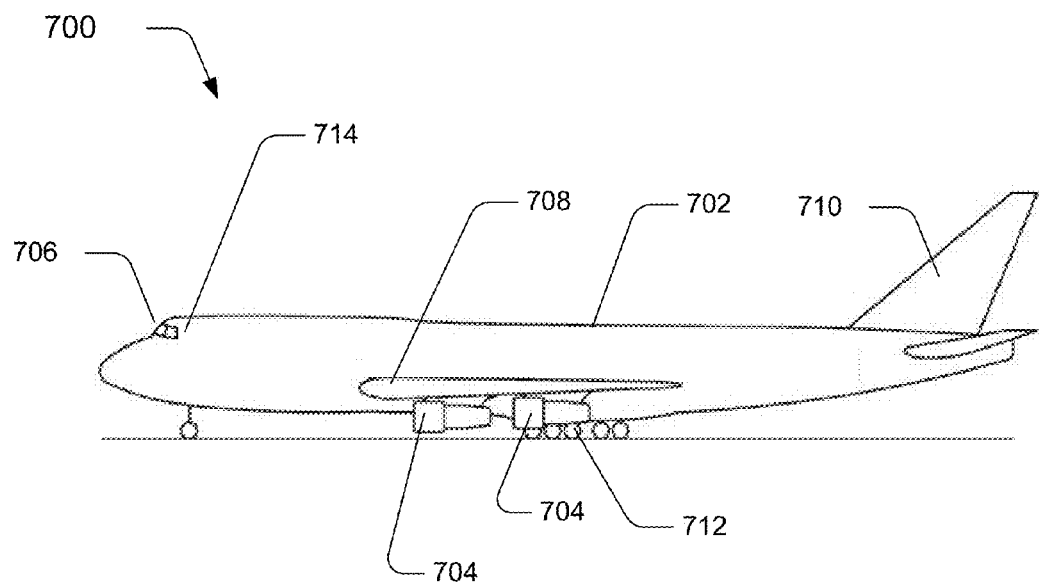
FIG. 7 is a side elevational view of an aircraft equipped with an avionics system that provides vehicle-centric collision avoidance, in accordance with an embodiment.

FIG. 7 is a side elevational view of an aircraft 700 in accordance with an embodiment of the present disclosure. In general, except for one or more systems in accordance with the present disclosure, the various components and subsystems of the aircraft 700 may be of known construction and, for the sake of brevity, will not be described in detail herein. As shown in FIG. 7, the aircraft 700 includes one or more propulsion units 704 coupled to a fuselage 702, a cockpit 706 in the fuselage 702, wing assemblies 708 (or other lifting surfaces), a tail assembly 710, a landing assembly 712, a control system (not visible), and a host of other systems and subsystems that enable proper operation of the aircraft 700. At least one component of a vehicle-centric collision avoidance system 714 formed in accordance with the present disclosure is located within the fuselage 702. However, components of the collision avoidance system 714 may be distributed throughout the various portions of the aircraft 700.

Although the aircraft 700 shown in FIG. 7 is generally representative of a commercial passenger aircraft, including, for example, the 737, 747, 757, 767, 777, and 787 models commercially-available from The Boeing Company of Chicago, Ill., the inventive apparatus and methods disclosed herein may also be employed in the assembly of virtually any other types of aircraft. More specifically, the teachings of the present disclosure may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom. It may also be appreciated that alternate embodiments of system and methods in accordance with the present disclosure may be utilized in other aerial vehicles, both manned and unmanned, as well as other hardware such as, satellites, robots, etc.

It should be appreciated that the illustrated avionics system 200 is only one example of a suitable operating environment and is not intended to suggest any limitation as to the scope of use or functionality of the invention. Other avionic environments and/or configurations may be suitable for use with the invention. For example, the exemplary collision avoidance computer 212 may a part of an autopilot 206. In other exemplary instances, one or more of the modules 218-228, as well as database 230, may be directly implemented on the autopilot 206, flight director 208, or any other suitable avionic component, navigation system, or any avionic system present in an aircraft that is capable of receiving, processing, and storing data.

Embodiments of systems and methods in accordance with the present disclosure may provide significant advantages over the prior art. The vehicle-centric collision avoidance systems in accordance with the various embodiments may advantageously alter the flight paths of one or more aircraft based when their predicted closest point of approach (CPA) is expected to breach a predefined separation perimeter. In this way, collision avoidance may be performed without human intervention. Automated collision avoidance may reduce or eliminate the possibility of human error or improperly performed collision avoidance maneuvers. Moreover, the vehicle-centric collision avoidance systems in accordance with the various embodiments may diminish the need for ground air traffic controllers to direct aircraft separation. Such labor savings may make it possible for the air traffic controller to manage a larger number of aircraft than previously possible. Lastly, the vehicle-centric collision avoidance system may also be implemented on unmanned aircraft to enable better control and performance.

While various embodiments have been illustrated and described above, many changes can be made without departing from the spirit and scope of the embodiments. Accordingly, the scope of the embodiments is not limited by the disclosure of these embodiments. Instead, the scope should be determined entirely by reference to the claims that follow.

What is claimed is:

1. A computer readable storage device comprising computer-readable instructions which, when executed by a processor, cause the processor to at least:
   determine a first flight trajectory for a first aircraft;
   determine a second flight trajectory for a second aircraft;
   predict a distance between the first aircraft and the second aircraft at a predicted closest point of approach based on the first and second flight trajectories;
   compare the distance to a separation perimeter layer, the separation perimeter layer configured to provide at least a threshold separation distance from the first aircraft to the second aircraft; and
   in response to the distance breaching the separation perimeter layer and without human input, alter the first flight trajectory.

2. The storage device as defined in claim 1, wherein the instructions are further to cause the processor to compute a first direction from a current position of the first aircraft to the predicted closest point of approach, the instructions to cause the processor to alter the first flight trajectory by altering the first flight trajectory in a second direction that is different than the first direction.

3. The storage device as defined in claim 1, wherein the instructions are to cause the processor to predict the distance by continuously predicting the distance to the separation perimeter layer as the first aircraft moves along the first flight trajectory, the instructions to further cause the processor to reinstate at least a portion of the first flight trajectory when the distance does not breach the separation perimeter layer.

4. The storage device as defined in claim 1, wherein the instructions are further to cause the processor to reinstate at least a portion of the first flight trajectory when the distance between the first aircraft and the second aircraft at the predicted closest point of approach does not breach the separation perimeter layer.

5. The storage device as defined in claim 1, wherein the instructions are further to cause the processor to generate flight control commands to cause the first aircraft to implement the first flight trajectory, the instructions to cause the processor to alter the first flight trajectory by assigning a gain prior to implementing the first flight trajectory as flight control commands.

6. The storage device as defined in claim 1, wherein the instructions are further to cause the processor to predict a time to reach the predicted closest point of approach from a current position of the first aircraft, the instructions to cause the processor to alter the first flight trajectory by altering the first flight trajectory using a magnitude that varies inversely to a duration of the time to reach the predicted closest point of approach.

7. The storage device as defined in claim 1, wherein the instructions are to cause the processor to alter the first flight trajectory by altering the first flight trajectory using a magnitude that varies inversely to a length of the predicted distance between the first aircraft and the second aircraft at the predicted closest point of approach.

8. An aircraft, comprising:
a structural assembly;
a trajectory generator to determine a first flight trajectory for the aircraft; and
a collision avoidance component to:
predict a distance between the aircraft and a second aircraft at a predicted closest point of approach based on the first flight trajectory and a second flight trajectory;
compare the distance to a separation perimeter layer, the separation perimeter layer configured to provide at least a threshold separation distance from the aircraft to the second aircraft; and
in response to the distance breaching the separation perimeter layer and without human input, alter the first flight trajectory.

9. The aircraft as defined in claim 8, wherein the collision avoidance component is to compute a first direction from a current position of the aircraft to the predicted closest point of approach, the collision avoidance component to alter the first flight trajectory by altering the first flight trajectory in a second direction that is different than the first direction.

10. The aircraft as defined in claim 8, wherein the collision avoidance component is to predict the distance by continuously predicting the distance to the separation perimeter layer as the aircraft moves along the first flight trajectory, the collision avoidance component to reinstate at least a portion of the first flight trajectory when the distance does not breach the separation perimeter layer.

11. The aircraft as defined in claim 8, wherein the collision avoidance component is to reinstate at least a portion of the first flight trajectory when the distance between the aircraft and the second aircraft at the predicted closest point of approach does not breach the separation perimeter layer.

12. The aircraft as defined in claim 8, wherein the collision avoidance component is to generate flight control commands to cause the aircraft to implement the first flight trajectory, the collision avoidance component to alter the first flight trajectory by assigning a gain prior to implementing the first flight trajectory as flight control commands.

13. The aircraft as defined in claim 8, wherein the collision avoidance component is to predict a time to reach the predicted closest point of approach from a current position of the aircraft, the collision avoidance component to alter the first flight trajectory by altering the first flight trajectory using a magnitude that varies inversely to a duration of the time to reach the predicted closest point of approach.

14. The aircraft as defined in claim 8, wherein the collision avoidance component is to alter the first flight trajectory by altering the first flight trajectory using a magnitude that varies inversely to a length of the predicted distance between the aircraft and the second aircraft at the predicted closest point of approach.

15. The aircraft as defined in claim 8, wherein the trajectory generator is to determine the second flight trajectory for the second aircraft.

16. The aircraft as defined in claim 8, wherein the aircraft comprises an unmanned aircraft.

17. A method comprising:
determining a first trajectory for a first vehicle;
determining a second trajectory for a second vehicle;
predicting a distance between the first vehicle and the second vehicle at a predicted closest point of approach based on the first and second trajectories;
comparing the distance to a separation perimeter layer, the separation perimeter layer configured to provide at least a threshold separation distance from the first vehicle to the second vehicle; and
in response to the distance approaching the separation perimeter layer and without human input, altering the first trajectory to avoid a breach of the separation perimeter layer by the first vehicle or second vehicle.

18. The method as defined in claim 17, further comprising altering the second trajectory of the second vehicle automatically and without human input in response to the distance approaching the separation perimeter layer.

19. The method as defined in claim 18, wherein altering the second trajectory decreases an amount of alteration of the first trajectory to avoid a breach of the separation perimeter layer.

20. The method as defined in claim 19, wherein the second vehicle resumes the second trajectory after determining that the distance between the first vehicle and the second vehicle at the predicted closest point of approach is not approaching the separation perimeter layer.

* * * * *